2,955,708
POLYETHYLENE COMPOSITION

Walter R. Hausch, Akron, Ohio, assignor to The Firestone Tire & Rubber Company, Akron, Ohio, a corporation of Ohio No Drawing. Filed May 7, 1956, Ser. No. 582,952

11 Claims. (Cl. 206—84)

This invention relates to novel polyethylene compositions. More particularly, the invention embraces polyethylene compositions which form homogeneous mixtures with rubber at relatively low temperatures.

It is known to package pulverulent and particulate rubber compounding materials in polyethylene bags or containers of appropriate size for direct addition to the rubber mix. Conventionally, such polyethylene bags of compounding materials are dropped into the mixing apparatus, such as a Banbury mixer or rubber calender employed in the rubber compounding operation. Such a procedure affords the obvious advantage of minimizing atmospheric contamination and loss of compounding ingredients. Similarly, synthetic rubber is frequently shipped in the form of bales wrapped in polyethylene which are utilized directly, with the wrapper intact, in subsequent compounding operations.

It has been discovered that conventional polyethylene does not readily form a uniform homogeneous mixture when added to rubber in relatively low temperature mixing or compounding procedures, particularly such procedures in which the temperature does not exceed about 220° F. Such procedures are frequently employed in the production of various types of rubber materials, including skim stocks. Utilization in such processes of compounding materials or rubber packages in conventional polyethylene results in an unsatisfactory heterogeneous stock which contains particles of undispersed polyethylene and which forms blisters when cured.

Accordingly, it is a primary object of the invention to provide a novel polyethylene composition which is dispersible in rubber to form a substantially homogeneous mixture at low compounding temperatures.

It is a more specific object of the invention to provide a novel polyethylene rubber bale wrapper which disperses readily in rubber to form a uniform homogeneous mixture at low compounding temperatures.

It is a further specific object of the invention to provide a polyethylene bag or package for rubber compounding materials which package is readily dispersible in rubber at temperatures not in excess of 220° F.

In accordance with this invention, there is provided a novel composition comprising polyethylene containing a material selected from the group consisting of the higher fatty acid salts of dehydroabietyl amine, dehydroabietic acid nitrile, and mixtures thereof, said material being present in a small amount sufficient to render said composition dispersible in rubber to produce a substantially homogeneous mixture, particularly at temperatures not in excess of 220° F.

The novel polyethylene compositions of the invention blend with rubber at low compounding temperatures to produce uniform homogeneous rubber stocks which are substantially free from particulate polyethylene and which do not blister when cured.

The dehydroabietyl amine from which the fatty acid salts contemplated by the invention are derived are known commercial materials responding to the following formula:

I

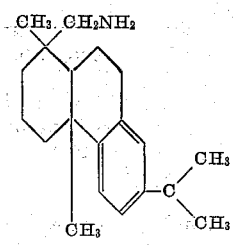

Dehydroabietyl Amine

The higher fatty acid salts of dehydroabietyl amine are also known generally commercially available materials. Dehydroabietyl amine salts of all of the higher fatty acids, saturated and unsaturated, straight and branched chain, containing more than 10 carbon atoms are contemplated by the invention. Dehydroabietyl amine salts of higher fatty acids containing from about 12 to about 20 carbon atoms are preferred. Specifically contemplated dehydroabietyl amine salts include the salts of lauric acid, tridecanoic acid, myristic acid, pentadecanoic acid, palmitic acid, heptadecanoic acid, stearic acid, nonadecanoic acid, arachidic acid, linderic acid, tsuzuic acid, myristoleic acid, palmitoleic acid, petroselenic acid, oleic acid, elaidic acid, gadoleic acid, linoleic acid, linolenic acid, santalbic acid, eleostearic acid, punicic acid, trichosanic acid, and parinaric acid. The dehydroabietyl amine salts particularly preferred for use in the invention are dehydroabietyl amine stearate, dehydroabietyl amine palmitate, dehydroabietylamine myristate, dehydroabietyl amine laurate, and dehydroabietyl amine oleate. Additionally contemplated by the invention are the dehydroabietyl amine salts of mixtures of fatty acids, particularly those which are derived from natural fats, such as coconut oil, nutmeg fat, palm oil, palm kernel oil, cottonseed oil, cocoa butter, peanut oil, marine animal oils, tung oil, etc.

The amine fatty acid salts of dehydroabietyl amine contemplated by the invention are represented by the following structural formula, wherein R is a hydrocarbon radical, preferably containing from 11 to 19 carbon atoms:

II

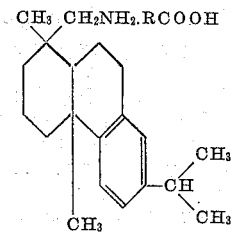

The amine salts contemplated by the invention can be produced by well known methods for the production of amine salts, including direct reaction between the dehydroabietyl amine and the fatty acid selected pursuant to the following equation wherein X represents a dehydroabietyl radical and R has the same significance as in Formula I:

III 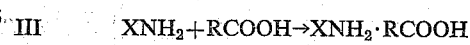

The dehydroabietic acid nitrile contemplated by the invention is a known commercial material which responds to the structural formula:

IV

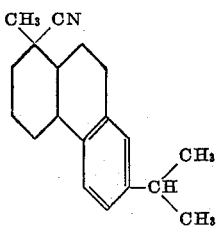

The dehydroabietyl amine salts and dehydroabietic acid nitrile are employed in the polyethylene compositions of the invention in minor amounts sufficient to render the polyethylene material dispersible in rubber to produce a substantially homogeneous mixture at temperatures not in excess of 220° F. Preferably, the additive materials contemplated by the invention are employed in an amount equal to from about 1.5% to about 10% by weight, based on the total composition. A particularly preferred range is from about 3.5% to about 5% by weight.

The novel polyethylene compositions of the invention can be prepared by any method effective to provide a uniform mixture of the polyethylene and the dehydroabietyl amine salt or dehydroabietic acid nitrile. Suitable methods include the addition of the amine salt or nitrile either as a solid, in solution, or in the form of a slurry or emulsion in a non-solvent to polyethylene in particulate form, such as a fluff or molding powder. Subsequent extrusion or other conversion of the molding powder produces sheets (films and the like in which the additive materials are uniformly distributed. Alternatively, the amine salt or nitrile may be incorporated into the polyethylene by melt blending the ingredients in conventional apparatus, such as a Banbury mixer, heated rolls, or a plasticator.

The invention is applicable to all of the various species or types of solid ethylene polymers or polyethylenes. Representative polyethylene materials include the conventional so-called high pressure polyethylenes; the more recently developed so-called low pressure polyethylenes, such as the Zeigler polyethylene, and the polyethylene materials produced by the Phillips Petroleum Company under the trade name of "Marlex." Similarly, the solid polymers of ethylene produced, inter alia, by Imperial Chemical Industries under intermediate conditions of temperature and pressure, and having properties intermediate those of the high and low pressure polyethylenes, are contemplated.

The invention finds utility in providing polyethylene material which is readily dispersible not only in natural rubber, but also in the various synthetic rubber materials, such as the Buna rubbers, the GR-S rubbers, and the like. Films formed from the polyethylene compositions of the invention are particularly useful as wrappers for rubber bales. Similarly, films of the polyethylene compositions of the invention are suitable for packaging carbon black and other pulverulent or particulate rubber compounding ingredients to produce packages which may be added directly to the rubber mix in conventional compounding apparatus.

The following examples are illustrative of specific embodiments of the invention.

*Example I*

Three portions, each containing 100 parts by weight, of conventional commercial polyethylene were respectively blended with 3.5, 7 and 14 parts by weight of dehydroabietyl amine stearate. The blending was effected by adding the amine stearate to the polyethylene on a rubber type mill, the temperature of which was maintained so that the polyethylene was soft and millable. The softening points of the blends so produced were, respectively, about 200° F., about 190° F. and about 185° F.

100 parts by weight of a rubber skim stock containing equal parts by weight of Hevea and GR-S rubber was compounded for three minutes in a Banbury mixer at a temperature of 195–200° F. with one part by weight of the polyethylene composition above described containing 3.5 parts by weight of dehydroabietyl amine stearate and having a softening point of about 200° F.

Microscopic examination of the resulting blend revealed complete dispersion of the polyethylene composition in the rubber to produce a homogeneous mix free of particulate polyethylene. Tensile slabs produced from the blend by curing at 280° F. for sixty minutes were characterized by modulus and tensile values equal to an unmodified rubber control subjected to identical processing conditions in the Banbury mixer.

By way of comparison, one part by weight of unmodified polyethylene, identical with that above described, was compounded with 100 parts by weight of the same rubber stock for three minutes in a Banbury mixer at a temperature of 195–200° F. The resulting blend was heterogeneous. Microscopic examination revealed pieces of polyethylene distributed at random in the mix. Cured tensile slabs prepared from the mix demonstrated many small blisters and were characterized by modulus and tensile values lower than an unblended rubber control resulting from identical processing in the Banbury mixer, in the absence of polyethylene.

*Example II*

100 parts of commercial polyethylene molding powder, having a softening point of about 200° F., a tensile strength of about 1875 p.s.i., and elongation at break across the grain of about 500%, was mixed with five parts by weight of dehydroabietyl amine stearate by adding the amine stearate to the polyethylene on a rubber mill heated so that the polyethylene was just millable. The blend so produced was homogeneous and free of particulate polyethylene. Film formed in conventional manner from the blend was characterized by the following physical properties:

| Stress Strain Properties | With Grain | Across Grain |
| --- | --- | --- |
| Tensile_____p.s.i.____ | 2,100 | 1,450 |
| Elong. at Break_____percent__ | 215 | 520 |
| Gauge_____inches__ | .0024 | |

| Elmendorf Tear Test | With Grain | Across Grain |
| --- | --- | --- |
| Tear_____grams__ | 448 | 307 |
| Weight/Sq. Yd._____do____ | 43.2 | |
| Gauge_____inches__ | .0028 | |

The film so produced was heat-sealable by conventional means as by use of an electric heating iron.

A bale of GR-S synthetic rubber was wrapped in the film so produced. The wrapped bale was ultimately employed in its entirety in a conventional rubber compounding operation with the wrapper intact. The resulting mix was a homogeneous rubber stock in which no particles of polyethylene were apparent and did not blister or otherwise demonstrate adverse properties occasioned by the presence of the polyethylene material.

*Example III*

A blend of 100 parts of commercial polyethylene, of the type described in Example I, and six parts by weight of dehydroabietic acid nitrile was prepared in the same manner as in Example I. The polyethylene composition so produced was characterized by a softening point substantially lower than the unmodified polyethylene and was useful for the same purposes as the polyethylene composition described in Example I.

Example IV

A blend of 100 parts of commercial polyethylene having a softening point of about 200° F., a tensile strength of about 1875 p.s.i., and elongation at break across the grain of about 500% was blended with a mixture of 1.5 parts by weight of dehydroabietyl amine stearate and 4.5 parts by weight of dehydroabietic acid nitrile to produce a polyethylene composition dispersible in rubber and characterized by a softening point substantially lower than the unmodified polyethylene starting material.

Example V

A blend of 100 parts of the same type of polyethylene as described in Example IV with six parts by weight of dehydroabietic acid nitrile was produced in the same manner as in Example IV to produce a modified polyethylene composition readily dispersible in rubber at temperatures below 200° F. and characterized by a softening point substantially lower than that of the unmodified polyethylene material.

Example VI

A modified polyethylene film, identical with that described in Example II, was produced and employed as a bale wrapper for bales of GR-S rubber. The wrapped bales of rubber so produced were shipped in a railroad car to a rubber compounding plant and stocked for five weeks during the month of August. The bales were then introduced, with the wrapper intact, into a rubber compounding operation in a Banbury mill operated at a maximum temperature of about 220° F. on a short mixing cycle of about four minutes, and employed in the production of tire carcass stocks. The polyethylene film wrappers completely dispersed in the carcass stocks in the Banbury mixer to produce homogeneous materials substanially free of polyethylene particles. The carcass stocks so produced demonstrated no adverse effects as a consequence of the presence of the polyethylene. The modified polyethylene wrapper was equal to similar wrappers of unmodified polyethylene, but was dispersible in rubber stocks at temperatures lower than that at which unmodified polyethylene wrappers would disperse.

In the foregoing portions of this specification, the invention has been described particularly with reference to the use of higher fatty acid salts of dehydroabietyl amine and dehydroabietic acid nitrile, primarily for the reason that these materials are more readily available commercially. It will be appreciated that the higher fatty acid salts of abietyl amine and the higher fatty acid salts of hydroabietyl amine are the full equivalent of the corresponding salts of dehydroabietyl amine and are embraced by and within the purview of this invention. Similarly, abietic acid nitrile and hydroabietic acid nitrile are the equivalent of dehydroabietic acid nitrile and are embraced within the scope of the invention.

The invention as herein described represents a substantial advance in the art providing a polyethylene packaging material which is readily dispersible in rubber compositions at relatively low temperatures to provide homogeneous compositions, thereby extending the utility of polyethylene into fields where it was heretofore impractical.

I claim:

1. A composition comprising polyethylene and from about 1.5% to about 10% by weight of a material selected from the group consisting of the higher fatty acid salts of dehydroabietyl amine, dehydroabietic acid nitrile, and mixtures thereof, said material being present in a small amount sufficient to render said composition dispersible in a rubber selected from the group consisting of natural rubber, the Buna rubbers and the GR-S rubbers to produce a substantially homogeneous mixture at temperatures not in excess of 220° F., the fatty acid in said salt containing 12 to 20 carbon atoms.

2. The composition of claim 1 wherein said material is a higher fatty acid salt of dehydroabietyl amine.

3. A composition comprising polyethylene and from about 3.5% to about 5% by weight of a higher fatty acid salt of dehydroabietyl amine.

4. A composition comprising polyethylene and from about 1.5% to about 10% by weight of dehydroabietyl amine stearate.

5. A polyethylene film containing from about 1.5% to about 10% by weight of a higher fatty acid salt of dehydroabietyl amine sufficient to render said film dispersible in rubber to produce a homogeneous mixture at temperatures not in excess of 220° F., the fatty acid in said salt containing 12 to 20 carbon atoms.

6. The polyethylene film of claim 5 wherein the higher fatty acid salt of dehydroabietyl amine is dehydroabietyl amine stearate.

7. A polyethylene film containing from about 1.5% to about 10% by weight of dehydroabietic acid nitrile sufficient to render said film dispersible in rubber to form a substantially homogeneous mixture at temperatures not in excess of 220° F.

8. A composition comprising polyethylene and from about 1.5% to about 10% by weight of a mixture of a higher fatty acid salt of dehydroabietyl amine and dehydroabietic acid nitrile, the fatty acid in said salt containing 12 to 20 carbon atoms.

9. The composition of claim 8 wherein said salt is dehydroabietyl amine stearate.

10. A rubber selected from the group consisting of natural rubber, the Buna rubbers and the GR-S rubbers packaged in polyethylene film containing from about 1.5% to about 10% by weight of a material selected from the group consisting of a higher fatty acid salt of dehydroabietyl amine, dehydroabietic acid nitrile, and mixtures thereof, the fatty acid in said salt containing 12 to 20 carbon atoms.

11. The package of claim 10 in which the salt present in said polyethylene film is dehydroabietyl amine stearate.

References Cited in the file of this patent

UNITED STATES PATENTS

| Number | Name | Date |
|---|---|---|
| 2,461,349 | Ralston et al. | Feb. 8, 1949 |
| 2,483,797 | Valkenburgh | Oct. 4, 1949 |
| 2,491,913 | Amberg | Dec. 20, 1949 |
| 2,572,959 | Sparks et al. | Oct. 30, 1951 |
| 2,762,504 | Sparks et al. | Sept. 11, 1956 |